United States Patent
Basil et al.

(10) Patent No.: US 8,148,487 B2
(45) Date of Patent: Apr. 3, 2012

(54) POLYSILOXANE COATING WITH HYBRID COPOLYMER

(75) Inventors: John D. Basil, Pittsburgh, PA (US); Robert M. Hunia, Kittanning, PA (US); Laura B. McGrady, Natrona Heights, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 274 days.

(21) Appl. No.: 12/543,615

(22) Filed: Aug. 19, 2009

(65) Prior Publication Data

US 2011/0046337 A1 Feb. 24, 2011

(51) Int. Cl.
*C08G 77/14* (2006.01)
(52) U.S. Cl. .......................................... 528/34
(58) Field of Classification Search .................. 528/34
See application file for complete search history.

(56) References Cited

U.S. PATENT DOCUMENTS

| | | | |
|---|---|---|---|
| 5,231,156 A | 7/1993 | Lin | |
| 5,399,601 A * | 3/1995 | Kusumi et al. | 524/188 |
| 5,401,579 A | 3/1995 | Basil et al. | |
| 5,693,422 A | 12/1997 | Basil et al. | |
| 6,106,605 A | 8/2000 | Basil et al. | |
| 6,180,248 B1 | 1/2001 | Basil et al. | |
| 6,469,119 B2 | 10/2002 | Basil et al. | |

FOREIGN PATENT DOCUMENTS

| | | |
|---|---|---|
| EP | 0 050 249 A2 | 4/1982 |
| EP | 0 063 753 A2 | 11/1982 |
| WO | 2006/118669 A1 | 11/2006 |

OTHER PUBLICATIONS

International Search Report, PCT/US2010/043209, dated Feb. 4, 2011.

* cited by examiner

*Primary Examiner* — Kuo-Liang Peng

(74) *Attorney, Agent, or Firm* — Andrew C Siminerio

(57) ABSTRACT

A coating includes the reaction product of (a) a hybrid copolymer incorporating (i) a first monomer including a hydroxy-functional organoacrylate and (ii) a second monomer including an organoalkoxysilane and (b) a second material including an organofunctional alkoxysilane. The first monomer can be a hydroxy functional acrylate and/or a hydroxyalkylacrylate. The second monomer can be a trialkoxysilane. The second material can be a trialkoxysilane.

10 Claims, No Drawings

POLYSILOXANE COATING WITH HYBRID COPOLYMER

BACKGROUND OF THE INVENTION

1. Field of the Invention

The present invention relates generally to protective coatings and, in one particular embodiment, to a flexible siloxane-based polymeric coating incorporating a hybrid copolymer.

2. Technical Considerations

In the aviation industry, aircraft windows commonly incorporate a plastic substrate, such as a polycarbonate or stretched acrylic substrate. These plastic substrates provide excellent safety performance and are lighter than conventional glass substrates, which decreases the overall weight of the aircraft. It is known to apply a protective, abrasion-resistant coating onto the plastic substrate to protect the substrate from mechanical and/or chemical damage during aircraft operation. For example, some commercially available protective coatings contain colloidal silica. However, these commercial coatings can exhibit poor resistance to solvents, such as acetone and sulfuric acid. Other commercially available protective coatings are based on relatively soft organic polymer systems, such as urethanes or melamines.

In an effort to improve the protection to the underlying substrate, harder, more durable polysiloxane-based coatings were developed. These harder coatings provide much improved protection compared to the previous softer coatings. However, these hard coatings are by nature less flexible than the prior softer coatings.

Therefore, it would be advantageous to provide a protective coating that provides not only excellent scratch, abrasion, and chemical resistance of a polysiloxane coating but also improved flexibility to better withstand elongation or deformation of the plastic substrate that can occur during aircraft operation.

SUMMARY OF THE INVENTION

A method of making a coating comprises forming a hybrid copolymer comprising (i) a first monomer comprising a hydroxy-functional organoacrylate and (ii) a second monomer comprising an organoalkoxysilane. The hybrid copolymer can be formed by free radical polymerization. The method further includes providing a second material (e.g., a monomer) capable of reacting with the hybrid copolymer and polymerizing with itself. The second material is reacted in the presence of the hybrid copolymer, for example by condensation polymerization, to form a polysiloxane of the invention. This allows the second material to react with the hybrid copolymer as well as to polymerize with itself, for example by condensation polymerization, providing a mechanism for direct chemical bonding between the two polymeric components. The first monomer can comprise a hydroxy functional acrylate and/or a hydroxyalkylacrylate. The second monomer can comprise an organofunctional alkoxysilane, such as a silicon alkoxide with a polymerizable group. The second material can comprise an alkoxysilane, such as an organoalkoxysilane, such as an alkylalkoxysilane, such as a mono-, di-, tri-, and/or tetra-alkoxysilane, or any combination thereof, such as an alkyltrialkoxysilane.

A coating comprises the reaction product of (a) a hybrid copolymer comprising (i) a first monomer comprising a hydroxy-functional organoacrylate and (ii) an organoalkoxysilane and (b) a second monomer comprising an organoalkoxysilane. The first monomer can comprise a hydroxy functional acrylate and/or a hydroxyalkylacrylate. The second monomer can comprise an organofunctional alkoxysilane, such as a silicon alkoxide with a polymerizable group. The second material can be an alkoxysilane, such as an organoalkoxysilane, such as an alkylalkoxysilane, such as a mono-, di-, tri-, and/or tetra-alkoxysilane, or any combination thereof, such as an alkyltrialkoxysilane.

DESCRIPTION OF THE PREFERRED EMBODIMENTS

As used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on an underlying surface but not necessarily in direct contact with the surface. For example, a coating layer "formed over" a substrate does not preclude the presence of one or more other coating layers or films of the same or different composition located between the formed coating layer and the substrate. As used herein, the term "film" refers to a coating region of a desired or selected coating composition. A "layer" can comprise one or more "films". A "coating" or "coating stack" can comprise one or more "layers". As used herein, the terms "polymer" or "polymeric" include oligomers, homopolymers, or polymers formed from two or more types of monomers, such as copolymers, terpolymers, etc. The term "copolymer" means a polymer having two or more different monomers. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 100 nm to less than 380 nm. Additionally, all documents, such as but not limited to, issued patents and patent applications, referred to herein are to be considered to be "incorporated by reference" in their entirety.

For purposes of the following discussion, the invention will be discussed with reference to use with a vehicle transparency, particularly an aircraft transparency in the form of an aircraft window. However, it is to be understood that the invention is limited to use with aircraft windows, but could be practiced with transparencies in any desired field, such as but not limited to, laminated or non-laminated residential and/or commercial windows, insulating glass units, and/or transparencies for land, air, space, above water and underwater vehicles. Therefore, it is to be understood that the specifically disclosed exemplary embodiments are presented simply to explain the general concept of the invention and that the invention is not limited to these specific exemplary embodiments.

The coating of the invention incorporates a polymer having both polysiloxane-based hard coating functionality as well as more flexible organopolymeric functionality, such as but not limited to acrylic or epoxy functionality. Exemplary protective coatings of the invention can be made as follows and as described in the following examples.

A hybrid copolymer is prepared having at least two different monomer units. In one particular non-limiting embodiment, the hybrid copolymer is a copolymer prepared from the reaction product of (i) a first monomer comprising a hydroxy-functional organoacrylate and (ii) a second monomer comprising an organofunctional alkoxysilane, such as a silicon alkoxide with a polymerizable group.

In one non-limiting embodiment, the first monomer comprises a hydroxyacrylate and/or a hydroxyalkylacrylate. The alkyl portion of the hydroxyalkylacrylate can be generally represented by the formula $C_nH_{2n+1}$ where n is in the range of 1-20, such as 1-10 such as 1-5. Specific examples of the first monomer include, but are not limited to hydroxymethylacrylate, hydroxyethylacrylate, and hydroxypropylacrylate.

The second monomer is an alkoxide, such as an organofunctional alkoxysilane, such as an organofunctional trialkoxysilane. The alkoxide may contain alkyl or aryl groups. Silanes of the general formula $R_xSi(OR')_{4-x}$ can be used, where R is an organic radical, R' is a low molecular weight alkyl radical, and x is in the range of 1 to 4. The organic radical of R can be, vinyl, methoxyethyl, 3-glycidoxypropyl, or 3-methacryloxypropyl, just to name a few. In one non-limiting embodiment, the second monomer is a trialkoxysilane of the general formula $RSi(OR')_3$, where R is a short to medium chain length organic group capable of undergoing polymerization such as vinyl, 3-glycidoxypropyl, or 3-methacryloxypropyl. In one particular embodiment, the second monomer is selected from methacryloxypropyltrimethoxysilane or vinyltrimethoxysilane.

The first and second monomers are combined with an appropriate catalyst, such as azobisisobutyrolnitrile (AIBN), to form a hybrid copolymer. In the broad practice of the invention, the first and second monomers can be combined in any ratio, such as 1 wt. % to 99 wt. % of the first monomer to 99 wt. % to 1 wt. % of the second monomer based on the total weight of the combined monomers, such as 40 wt. % to 90 wt. % of the first monomer, such as 50 wt. % to 80 wt. % of the first monomer, such as 60 wt. % to 80 wt. % of the first monomer, such as 70 wt. % to 80 wt. % of the first monomer, such as 75 wt. % of the first monomer. The hybrid copolymer can be polymerized by free radical polymerization.

The second material is reacted in the presence of the hybrid copolymer, for example by condensation polymerization, to form a polysiloxane polymer. This allows the second material to react with the hybrid copolymer as well as to polymerize with itself, for example by condensation polymerization, providing a mechanism for direct chemical bonding between the two polymeric components. The second material can comprise an alkoxide, such as an organoalkoxysilane. The organoalkoxysilane may be an alkylalkoxysilane or organofunctional alkoxysilane, such as an organofunctional trialkoxysilane, or a mixture thereof. In one non-limiting embodiment, the second material is a trialkoxysilane of the general formula $RSi(OR')_3$, where R is a short to medium chain length organic group such as alkyl, vinyl, phenyl, 3-glycidoxypropyl, or 3-methacryloxypropyl. In one particular embodiment, the second material is methyltrimethoxysilane.

The hybrid copolymer and the second material can be reacted by any known technique, such as a conventional condensation reaction. Examples of conventional techniques are described in U.S. Pat. Nos. 5,693,422; 5,401,579; 6,106,605; 6,180,248; and 6,469,119. The hybrid copolymer and second material can be combined in any desired ratio, such as 1 wt. % to 99 wt. % of the hybrid copolymer to 99 wt. % to 1 wt. % of the second material based on the total weight of the hybrid copolymer and second material, such as 5 wt. % to 50 wt. % of the hybrid copolymer, such as 10 wt. % to 40 wt. % of the hybrid copolymer, such as 10 wt. % to 30 wt. % of the hybrid copolymer, such as 15 wt. % to 20 wt. % of the hybrid copolymer, such as 17 wt. % of the hybrid copolymer.

The resultant hybrid copolymer of the invention (i.e. the polymer formed from the reaction of the first hybrid copolymer and the second material) can be incorporated into a coating composition that provides improved scratch, abrasion, and chemical resistance, yet sufficient to survive deformation or elongation of the underlying plastic substrate without cracking or debonding. The acrylic functionality provides enhanced weatherability and improved adhesion to both acrylic and polycarbonate substrates compared to previous protective hardcoats. In the practice of the invention, forming the hybrid copolymer by copolymerizing a hydroxy-functional acrylic monomer with a trialkoxysilane provides a copolymer that can undergo further hydrolysis of the alkoxy groups, resulting in a condensation reaction with the polysiloxane matrix of the coating solution.

While various aspects of the invention have been described above, other variations are contemplated within the scope of the invention. For example, but not to be considered as limiting, the hybrid copolymer need not be limited to a copolymer having two monomers but could include three or more monomers. For example, the resultant hybrid copolymer could be a terpolymer comprising a hydroxy-functional organoacrylate, a silicon alkoxide, and a non-hydroxy functional monomer, such as but not limited to methylmethacrylate or N-vinylpyrrolidone, or any such monomer that undergoes free radical polymerization. Moreover, the hybrid copolymer is not limited to alkylacrylates, but could incorporate other acrylic functional materials, such as but not limited to aromatic acrylates or halogenated acrylates, such as fluoracrylate. Also, in addition to forming organic/inorganic hybrid copolymers by co-polymerizing a (hydroxyfunctional) organic acrylate or methacrylate monomer with an acrylate or methacrylate functional silicon alkoxide, such organic-inorganic hybrid copolymers can be formed by combining any organic monomer with any silicon alkoxide compound that contains a polymerizable group that can undergo the same kind of polymerization reaction. 1,3-bis(3-methacryloxypropyl)tetrakis (trimethylsiloxy)disiloxane is a similar methacryloxypropyl-trimethylsiloxy compound. For example, vinyl, alkenyl, and styryl functional organosilanes such as vinyltrimethoxysilane, vinyltriethoxysilane, p-(t-butyldimethylsiloxy)stryrene, and vinyl terminated polydimethylsiloxane prepolymer can be copolymerized with organic monomers by thermal or UV initiated free radical polymerization, as can the acrylic and methacrylic functional organosilanes. Also, epoxy and glycidoxy-functional silicon alkoxides, bis [methyldimethoxysilyl)propyl]polypropyleneoxide, and epoxy terminated polydimethylsiloxane prepolymer can be co-polymerized with organic epoxides by cationic UV polymerization or amine addition polymerization. Further, monomers capable of undergoing condensation polymerization can be used to form hybrid polyimide, polyamide and urethane copolymers with the appropriate amine functional silicon compounds, such as 1,3-bis(aminopropyl)tetramethyldisiloxane. Monomers capable of undergoing substitution polymerization can be combined with silicon compounds such as bis(trimethylsilyl)bisphenol A to form hybrid copolymers by substitution polymerization. As recognized by those skilled in the art, various techniques for purifying the hybrid copolymer for, example by precipitation or fractionation, can be employed to obtain hybrid copolymer materials with a narrower distribution of properties and thereby affecting the properties of the coating composition.

A coating composition incorporating the resultant hybrid copolymer of the invention can be applied over at least a portion of a substrate in any conventional method, such as but not limited to spin coating, dipping, spraying, or flow coating, just to name a few. In the broad practice of the invention, the substrate can include any desired material having any desired characteristics. For example, the substrate can be transparent or translucent to visible light. By "transparent" is meant having visible light transmission of greater than 0% to 100%. Alternatively, the substrate can be translucent. By "translucent" is meant allowing electromagnetic energy (e.g., visible light) to pass through, but diffusing this energy such that objects on the side opposite the viewer are not clearly visible. Examples of suitable materials for the substrate include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or combinations of any of the above. In one non-limiting embodiment, the substrate is made of a polymeric material, such as stretched acrylic. However, in other embodiments, the substrate can be conventional soda-lime-silicate glass, borosilicate glass, leaded glass, low iron glass, lithium doped glass, or lithium alumina silicate glass. The glass plies can be clear glass, i.e., non-tinted or non-colored glass, or can be tinted or otherwise colored glass. The glass can be annealed, heat-treated, or chemically tempered glass. As used herein, the term "heat-treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. The coating of the invention could be used as a single coating stack or can be combined with other coatings or coating layers to give increased functionality. The coating may also be modified by the addition of materials such as are commonly added to coatings to impart additional functionality such as oxide nanoparticles to increase hardness and abrasion resistance, and UV absorbers and stabilizers.

The following examples illustrate various non-limiting embodiments of the invention. However, it is to be understood that the invention is not limited to the specific examples.

FORMATION OF THE HYBRID COPOLYMER

Example 1

The following ingredients were combined in a glass jar: 70 grams (g) of Dowanol PM glycol ether, 22.5 g of 2-hydroxypropylacrylate, 7.5 g of γ-methacryloxypropyltrimethoxysilane, and 0.06 g of azobisisobutyrolnitrile (AIBN). The solution was outgassed for 5 minutes under vacuum, purged with nitrogen gas via a bubbler for 5 minutes, and placed in a nitrogen filled oven at 180° F. overnight. The mixture was shaken several times over the first hour.

Example 2

45 g of 2-hydroxypropylacrylate, 15 g of γ-methacryloxypropyltrimethoxysilane, and 0.12 g of azobisisobutyrolnitrile (AIBN) were added to 140 g of Dowanol PM glycol ether in a glass jar containing a magnetic stir bar. The jar was placed in an ultrasonic bath for five minutes to assist dissolution of the AIBN, outgassed in a vacuum dessicator for 15 minutes, and transferred to a nitrogen-purged reaction setup consisting of a 250 milliliter (mL) 3-neck round bottom flask that was fitted with a reflux condenser, heating mantle, and nitrogen bubbler and heated to maintain approximately 80° C. overnight under nitrogen. The reaction mixture was allowed to cool to room temperature.

Example 3

45 g of hydroxypropylacrylate (mixture of isomers), 15 g of γ-methacryloxypropyltrimethoxysilane, and 0.12 g of azobisisobutyrolnitrile (AIBN) were added to 140 g of Dowanol PM glycol ether in a glass jar containing a magnetic stir bar. The solution was stirred for 2-3 minutes to dissolve most of the AIBN, placed in an ultrasonic bath for five minutes, degassed in a vacuum dessicator for 30 minutes, and transferred to a nitrogen-purged reaction setup consisting of a 250 mL 3-neck round bottom flask that was fitted with a reflux condenser, heating mantle, and nitrogen bubbler. After 10 minutes of vigorous nitrogen purge through the solution, heating was begun with stirring. After 45 minutes of heating, the nitrogen purge was slowed to a minimum and the temperature reached 50° C. The heat was increased so that the temperature of the reaction reached 62° C. within another 10 minutes, 78° C. within 20 minutes, at which time the exothermic reaction was in progress. The temperature reached a maximum of approximately 107-108° C. 15 minutes later, after which the exotherm subsided and the reaction mixture cooled to 70° C. After eight hours, the heat was again increased so that the reaction mixture reached 110° C. within 1 hour, at which time the heat was removed and the reaction mixture allowed to cool slightly before using to prepare a coating solution.

Example 4

Azobisisobutyrolnitrile (AIBN) had been recrystallized three times from methanol one week prior to use. In a manner similar to Example 3 above, the three ingredients were combined directly into a 500 mL 3-neck flask that was fitted with a reflux condenser, heating mantle, and nitrogen bubbler. The γ-methacryloxypropyltrimethoxysilane was added to the hydroxypropylacrylate, which was then within 3 minutes added to the Dowanol PM glycol ether in the round bottom flask. After five minutes of stirring at room temperature, heating was begun. Twenty minutes later the temperature of the solution had reached 50° C. and 0.10 g of AIBN dissolved in 10-15 mL of Dowanol PM was added via syringe through a rubber septum. Forty minutes later the temperature of the reaction mixture had reached the maximum of 119° C. (60 minutes after start of reaction), after which it fell to 83° C. which was maintained until the total reaction time reached 16 hours. After cooling to room temperature, the copolymer product was used to prepare a polysiloxane coating solution. Material that was not used immediately was transferred to a brown glass bottle and stored in a refrigerator. After seven weeks of refrigerated storage, the room temperature viscosity of the product solution was 61.1 centipoises (cps).

Example 5

Recrystallized azobisisobutyrolnitrile (AIBN) was again recrystallized one time from methanol prior to use. In a manner similar to Example 3 above, the three ingredients were combined directly into the 250 mL 3-neck flask. First the γ-methacryloxypropyltrimethoxysilane was added to the hydroxypropylacrylate, and then the mixture of the two monomers was added with stirring to 130 g of Dowanol PM glycol ether solvent (130 g) that had been purged with nitrogen in the 3-neck flask for 2 hours. Heating was begun immediately, with the reaction solution reaching 56° C. after 24 minutes, at which time 0.10 g of AIBN was added. The reaction solution reached 117° C. by 45 minutes after the start of the reaction. At approximately 1.25 hours reaction time, the temperature had fallen to 109° F. at which time the heat was decreased to maintain a temperature of 86° C. overnight. After a total time of 16.5 hours since start of the reaction, the heat was removed to allow the product to cool to room temperature in about an hour. The product was then used to prepare a polysiloxane coating solution or transferred to a brown glass bottle for refrigerated storage. After approximately 1 week of refrigerated storage, the viscosity of the product at room temperature was 130.6 cps.

Example 6

22.5 g of 2-hydroxypropyl acrylate, 7.5 g of γ-methacryloxypropyltrimethoxysilane, and 0.06 g of dimethoxy 2-phenyl acetophenone (DMPA) were added to 70.0 g of Dowanol PM glycol ether solvent in a glass jar and placed in an ultrasonic bath until the DMPA dissolved. The solution was then outgassed for 10 minutes under vacuum followed by curing for 1 hour at room temperature under an atmosphere of nitrogen in an ELC 4001 UV cure unit. The moderately viscous solution of the copolymer product was allowed to cool to room temperature prior to use in preparing a coating solution.

Preparation of Coating Solutions

Method I: In one non-limiting method, copolymer products of the type produced in Examples 1-6 were incorporated into durable abrasion resistant coating formulations as follows. In a typical preparation, 15 g of the copolymer product solution was added to 72 g of methyltrimethoxysilane. In a separate container, 15 g of methanol was combined with 44.1 g of Snowtex O aqueous colloidal silica sol (commercially available from Nissan Chemical) and 3.6 g of glacial acetic acid and 1 drop of concentrated nitric acid. The silane and copolymer mixture was slowly added into the aqueous silica solution with stirring. Stirring was continued overnight. The solution was then diluted with 125 g of 1-propanol, 0.3 g of BYK-306 (commercially available from BYK Chemie) and 0.75 g of 25% tetramethylammonium hydroxide in methanol (commercially available from Fisher Scientific).

Method II: In an alternate non-limiting method, 15 g of the copolymer products of Examples 1-6 were combined with 72 g of methyltrimethoxysilane and 45 g of NPC-ST colloidal silica sol in glycol ether PM (commercially available from Nissan Chemical). In a separate container, 30 g of deionized water was combined with 3.6 g of glacial acetic acid and 1 drop of concentrated nitric acid. The water-acid mixture was slowly added to the silane/copolymer/silica mixture with stirring, which was continued overnight. The solution was then diluted with 100 g of 1-propanol, 0.3 g of BYK-306 (commercially available from BYK Chemie) and 0.75 g of 25% tetramethylammonium hydroxide in methanol (commercially available from Fisher Scientific).

The coatings were applied to acrylic substrates by flow coating followed by drying in ambient air for 20-30 minutes and heat curing at 80° C. for 4 hours.

Test Procedures

The properties of the coatings were determined by subjecting them to the following standard test procedures.

Adhesion testing was performed as prescribed in ASTM D3359 with a modification based on using an alternate tape that gives stronger adhesion to the polysiloxane-type coatings.

Abrasion Resistance was measured by Taber abrasion according to ASTM D-1044 using CS-10° F. wheels, 500 g ea, 100 cycles on 4"×4" samples.

Craze resistance was performed as described in MIL-P-25690B but with 75% $H_2SO_4$ instead of the organic solvents as the craze initiating medium. For most tests the samples were also damaged by scratching with 0000 steel wool and cutting with a razor blade prior to testing. Occasionally the samples were pre-conditioned with 16 h immersion in 60° C. water, continuous condensing humidity at 140° F., or 100 h of QUV-B313 exposure according to ASTM G-53.

Flexibility of the coatings was determined by clamping 1"×12"×1/4" coated samples to various mandrels with radii of curvature ranging from 14 to 6" and calculating the % elongation at which the coating cracked.

Condensing humidity exposure was performed on 2"×6" coupons tested in a Q-Panel QCT Cleveland Condensation Tester at 140° F., 100% RH as per ASTM D-4584.

Accelerated UV exposure testing was performed on 3"×4" coupons tested in a QUV Accelerated Weathering Tester (Q-Panel Company, Cleveland, Ohio) according to the procedure specified in ASTM G-53. The QUV test used UVB-313 bulbs and a cycle of 4 hours of condensation at 50° C. with no light followed by 8 hours of dry UV exposure at 65° C.

TEST RESULTS

Sample 1

Coating compositions were prepared in accordance with Method I described above with the copolymer of Example 1. A 1"×7"×0.33" and a 4"×4"×0.35" sample of stretched acrylic substrate were coated with the coating composition, air dried under ambient conditions for 20 minutes, and cured in an oven for 4 h at 180° F. The coating appeared clear and smooth. The cured coating exhibited good adhesion and the thickness of the cured coating was measured to be 3.75-4.75 microns. After 100 cycles of Taber abrasion, 8.2% haze was measured. No craze after 1 h at 3500 psi. After 16 h, still no substantial craze, only two short crazes localized at a deep scratch. The coating changed little during subsequent total of 17 days on test.

The coated substrates were tested in accordance with the QUV test described above and there was no appreciable change after 1600 hours.

Sample 2

Coating compositions were prepared in accordance with Method II described above with the copolymer of Example 3.

When applied to a stretched acrylic substrate and cured as described above, the coatings had approximately 5 micron cured film thickness with good adhesion, exhibited a haze of 4.8% after 500 cycles of Taber abrasion, and no noticeable craze after 60 minutes.

Sample 3

Coating compositions were prepared in accordance with Method II described above with the copolymer of Example 5 and applied to a stretched acrylic substrate. The coatings were 4 to 7 microns thick and exhibited good adhesion to the substrate, 3 to 5% haze after 500 cycles of Taber abrasion, elongation of 1.5 to 2.5%, and more than 1 hour of sulfuric acid stress-to-craze test exposure.

It will be readily appreciated by those skilled in the art that modifications may be made to the invention without departing from the concepts disclosed in the forgoing description. Accordingly, the particular embodiments described in detail herein are illustrative only and are not limiting to the scope of the invention which is to be given the full breadth of the depended claims and any and all equivalence thereof.

The invention claimed is:

1. A coating composition, comprising:
   a polysiloxane polymer comprising the reaction product of:
   (a) a hybrid copolymer comprising:
      (i) a first monomer comprising a hydroxy functional organoacrylate; and
      (ii) a second monomer comprising an organoalkoxysilane; and
   (b) a second material comprising an organoalkoxysilane,
   wherein said hybrid copolymer is present in an amount of 5 percent by weight to 40 percent by weight, and said second material is present in an amount of from 60 percent by weight to 95 percent by weight, the weight percents in each case being based on total weight of said hybrid copolymer and said second material.

2. The composition of claim 1, wherein the first monomer is selected from a hydroxy functional acrylate and/or a hydroxyalkylacrylate.

3. The composition of claim 1, wherein the first monomer is selected from the group consisting of hydroxymethylacrylate, hydroxyethylacrylate, and hydroxypropylacrylate.

4. The composition of claim 1, wherein the second monomer is a trialkoxysilane.

5. The composition of claim 4, wherein the second monomer is methacryloxypropyltrimethoxysilane.

6. The composition of claim 1, wherein the second material is a trialkoxysilane.

7. The composition of claim 6, wherein the second material is methyltrimethoxysilane.

8. The composition of claim 1, wherein said hybrid copolymer is present in an amount of 10 percent by weight to 30 percent by weight, and said second material is present in an amount of from 70 percent by weight to 90 percent by weight, the weight percents in each case being based on total weight of said hybrid copolymer and said second material.

9. The composition of claim 1, wherein said hybrid copolymer is present in an amount of 15 percent by weight to 20 percent by weight, and said second material is present in an amount of from 80 percent by weight to 85 percent by weight, the weight percents in each case being based on total weight of said hybrid copolymer and said second material.

10. A coating comprising:
    a polysiloxane polymer comprising the reaction product of:
    (a) a hybrid copolymer comprising:
       (i) a first monomer comprising hydroxypropylacrylate; and
       (ii) a second monomer comprising methacryloxypropyltrimethoxysilane; and
    (b) a second material comprising methyltrimethoxysilane,
    wherein the hybrid copolymer is present in an amount in the range of 5 weight percent to 40 weight percent based on the total weight of the hybrid copolymer and the second material.

* * * * *